(12) United States Patent
Keuter et al.

(10) Patent No.: US 6,959,664 B1
(45) Date of Patent: Nov. 1, 2005

(54) LIMITED FLOW FEEDING TUBE

(75) Inventors: Karl Keuter, P.O. Box 279, Earlville, IA (US) 52041; Arlin Karsten, Waterloo, IA (US)

(73) Assignee: Karl Keuter, Earlville, IA (US)

( * ) Notice: Subject to any disclaimer, the term of this patent is extended or adjusted under 35 U.S.C. 154(b) by 0 days.

(21) Appl. No.: 10/249,580

(22) Filed: Apr. 21, 2003

(51) Int. Cl.$^7$ .......................... A01K 1/10; A01K 39/00; B65G 59/00; B67D 5/06
(52) U.S. Cl. ............................. 119/54; 119/75; 119/62; 119/53.5; 119/52.1; 119/51.01; 221/289; 221/295; 221/296; 222/185.1; 222/559
(58) Field of Search ........................ 119/408, 449, 454, 119/51.01, 52.1, 53.5, 54, 62, 61, 75, 76, 119/55, 51.93, 71, 72, 72.5; 222/185.1, 559, 222/556, 557, 533, 522, 525, 519; 221/289, 221/295, 296; D7/300; 47/48.5, 57.5

(56) References Cited

U.S. PATENT DOCUMENTS

| | | | | |
|---|---|---|---|---|
| 123,400 | A * | 2/1872 | Mackall ...................... | 425/350 |
| 634,927 | A * | 10/1899 | Wellsteed .................. | 119/53.5 |
| 1,309,090 | A * | 7/1919 | Henson ........................ | 119/54 |
| 2,576,154 | A * | 11/1951 | Trautvetter .................. | 119/72 |
| 2,809,468 | A * | 10/1957 | Eliot .............................. | 47/44 |
| 3,144,173 | A * | 8/1964 | France et al. ................. | 222/52 |
| 3,515,098 | A * | 6/1970 | Thurmond ................ | 119/51.01 |
| 5,170,729 | A * | 12/1992 | Benner ........................ | 111/7.2 |
| 5,405,047 | A * | 4/1995 | Hansen ........................ | 221/190 |
| 5,437,393 | A * | 8/1995 | Blicher et al. ................. | 222/77 |
| 5,447,119 | A * | 9/1995 | Rasmussen ................ | 119/51.5 |
| 5,850,805 | A * | 12/1998 | Kleinsasser ................... | 119/54 |
| 5,865,139 | A * | 2/1999 | Rasmussen ................ | 119/53.5 |
| 5,901,497 | A * | 5/1999 | Bulvin ........................ | 47/48.5 |
| 5,901,886 | A * | 5/1999 | Grindstaff et al. ........... | 222/557 |
| 6,091,028 | A * | 7/2000 | Ozaki et al. .................... | 177/1 |
| 6,502,720 | B2 * | 1/2003 | Schwederski ................ | 221/268 |

FOREIGN PATENT DOCUMENTS

| | | | | | |
|---|---|---|---|---|---|
| DE | | 2652788 A | * | 11/1976 | ............ A01K 5/02 |
| FR | | 2660155 A1 | * | 10/1991 | ............ A01K 5/00 |

* cited by examiner

*Primary Examiner*—Peter M. Poon
*Assistant Examiner*—Andrea M. Valenti
(74) *Attorney, Agent, or Firm*—Ryan N. Carter

(57) ABSTRACT

A swine feeder for use in feeding individually housed gestating swine. The feeder includes a hollow tube containing feed. The tube controls the amount of feed by having its lower, angled end contained within a feeding tube that is moveable by the individual sow to discharge the feed only when the sow applies a force to the feeding tube. The feeder may be connected to a supply of feed, and typically, the feeder is attached to the individual crate of each sow such that a limited amount of feed is dispersed into the sow's feeding area, usually a trough.

5 Claims, 2 Drawing Sheets

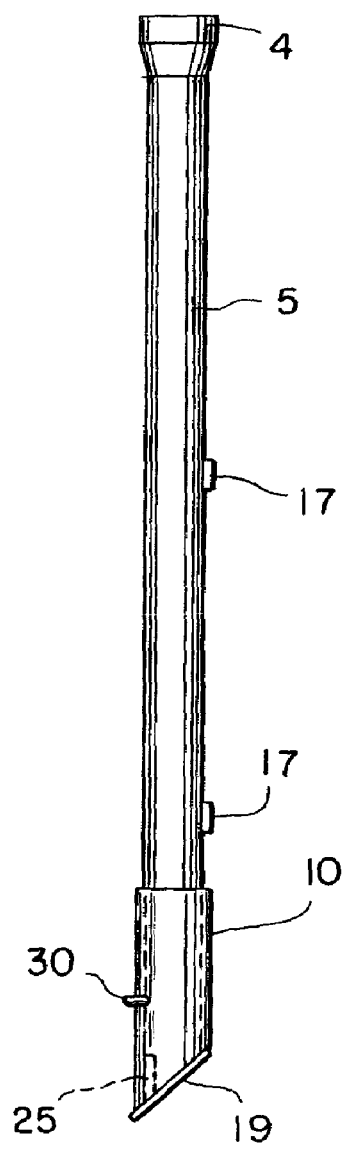
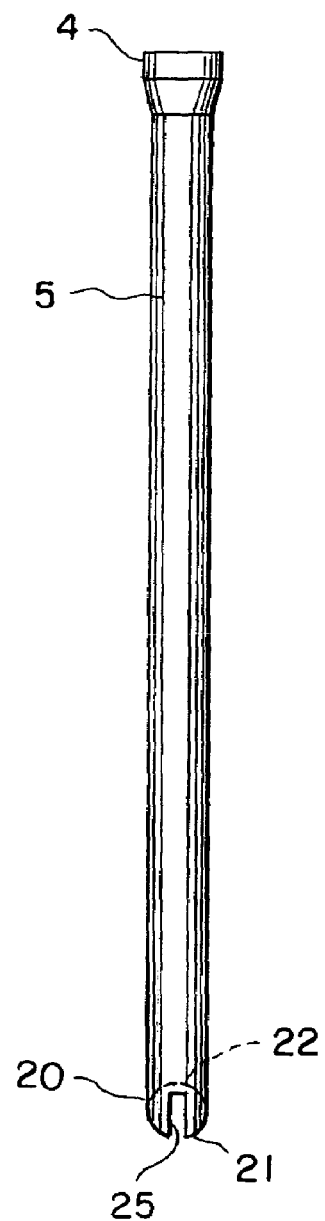
FIG. 3
FIG. 4

US 6,959,664 B1

LIMITED FLOW FEEDING TUBE

BACKGROUND OF INVENTION

As swine farming becomes an increasingly commercial activity, there is an increased emphasis on labor, feeding levels, productivity, and welfare of the swine. The feeding of gestating swine is an area of particular concern to today's farmer.

Feeding levels of gestating swine vary widely based on weight, body condition, and other factors. Appropriate daily nutrient intakes are necessary to insure optimum productivity and welfare. Individual housing systems for sows have improved accuracy as compared to group housing systems. However, several limitations still exist with systems that deliver the diet from a volumetric dispenser into a trough used for both feed and water. Dropping feed into a common trough without dividers between individual sows does not have a high level of feeding accuracy, results in a gorge feeding pattern, increases feed spillage into alleys, and requires removal of water access prior to feeding.

It is therefore desirable to provide an apparatus which would improve feeding level accuracy, labor efficiency, and welfare of individually housed gestating swine.

SUMMARY OF INVENTION

The present invention was developed to address the foregoing disadvantages of the prior art. The present invention is a swine feeder typically for use in feeding individually housed gestating swine. The feeder is designed so that a limited amount of feed is dispersed to the individual sow when the sow applies a force to the feeder. The feeding apparatus may be connected to a feeding system within swine housing. Typically, the feeding apparatus is attached to the individual crate of each sow such that a limited amount of feed is dispersed to an individual sow therefrom into the sow's feeding area, typically a trough.

It is an object of the present invention to provide feeding level accuracy amongst gestating swine and an apparatus for accomplishing the same.

It is a further object of the present invention to reduce the amount of feed spillage in the feeding of gestating swine and an apparatus for accomplishing the same.

A further object of the present invention is to eliminate the need for the removal of water from the gestating swine's trough prior to feeding and an apparatus for accomplishing the same.

A further object of the present invention is to decrease the labor required in caring for the gestating swine, such that the apparatus decreases the feed spillage, eliminates the need for daily drainage of water from troughs, and decreases manual movement of manure.

BRIEF DESCRIPTION OF DRAWINGS

FIG. 3 is a right side view of the apparatus shown in FIG. 1.

FIG. 4 is a detailed view of a tube component removed from the apparatus of FIG. 1.

DETAILED DESCRIPTION

Figure 1:
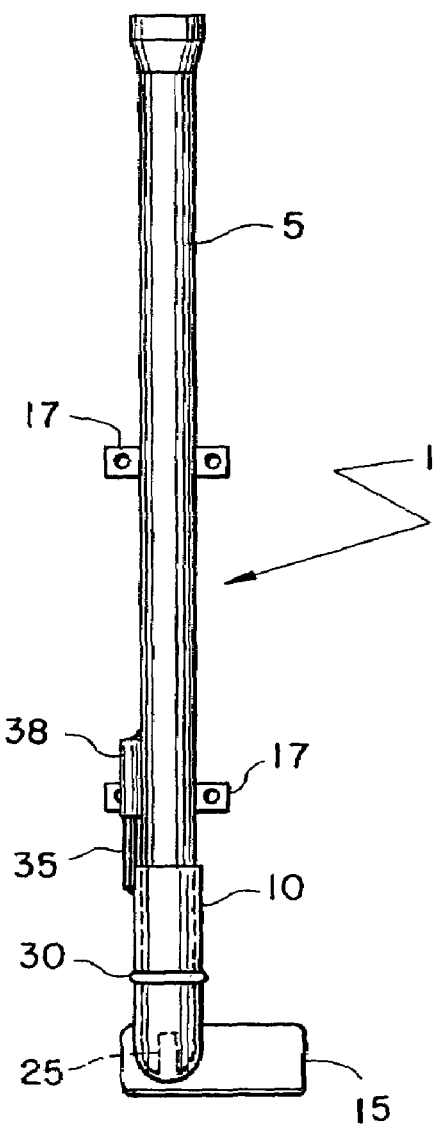
FIG. 1 is a plan view of the feeding apparatus of the invention.

Referring now to FIG. 1, there is an illustrated embodiment of the limited flow feeding tube, indicated generally by the reference numeral 1, for feeding swine. Feeding tube 1 includes a first hollow elongated tube 5. One skilled in the art would understand that first hollow tube 5 could be manufactured from any number of materials including, but not limited to, steel, aluminum, plastic, and fiber. One skilled in the art would understand that first hollow tube 5 may take any number of cross-section shapes including, but not limited to, circular, cylindrical, or rectangular. First hollow tube 5 has a flared end 4 and an angled end 20 that defines an upper edge 22 and a lower edge 21.

Second hollow tube 10 is of a larger diameter so as to receive and overlap the angled end 20 of first hollow tube 5, and the outer end 19 of second hollow tube 10 is parallel to the angled end 20 of the first hollow tube 5. One skilled in the art would understand that second hollow tube 10 may also be made of any number of materials including, but not limited to, steel, aluminum, plastic, and fiber. One skilled in the art would understand that second hollow tube 10 may take any number of cross-sectional shapes which would correspond to the cross-sectional shape of the first hollow tube 5.

A member 15 is adjacently attached in any suitable manner to first hollow tube 5 at its outer end. Member 15 serves as a stop for feed in the feeder 1 until the second hollow tube 5 is raised in the manner described hereinafter. Member 15 also may serve to aid in the support of the feeding tube 1 in a substantially vertical orientation in the feeding area where the tube 1 is installed. One skilled in the art would understand that member 15 may be attached to the feeding tube 1 by a variety of means including, but not limited to, bolts or welding. Straps 17 around the outside of the first hollow tube 5 may be used to support the feeding tube 1 on the frame of the farrowing crate, for example.

Figure 2:
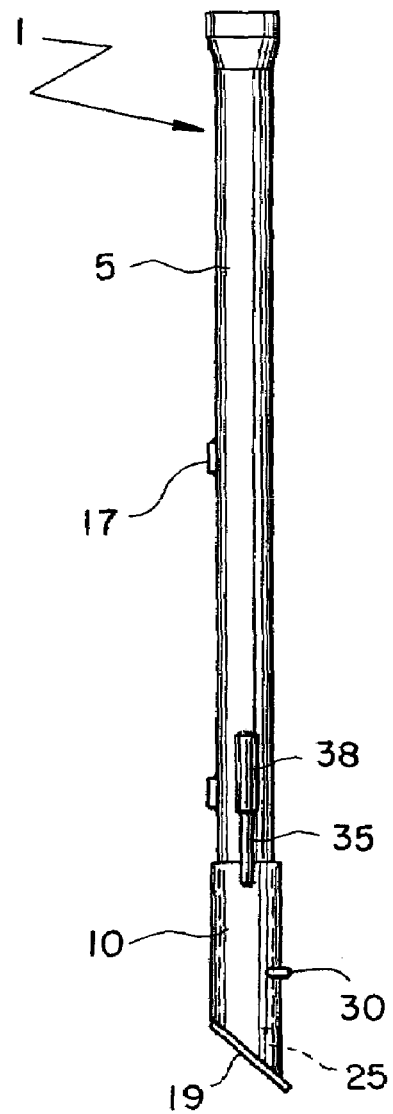
FIG. 2 is a left side view of the apparatus shown in FIG. 1.

Referring now to FIG. 2, a ring 30 is attached to outside of the second hollow tube 10. One skilled in the art would understand that ring 30 is not limited to a circular shape, but could be any sort of member projecting from second hollow tube 10 and large enough to be engaged by the sow's nose. When the gestating swine engages the ring 30, the second hollow tube 10 can be raised and lowered by the sow. To limit the movement of the second hollow tube 10 relative to the first hollow tube 5, a rod 35 is attached to second hollow tube 10 and a casing 38 is attached to first hollow tube 5. As the second hollow tube is raised, rod 35 engages casing 38 to limit the movement of the second hollow tube 10 along the first hollow tube 5. One skilled in the art would understand that casing 38 and rod 35 could take any number of forms so long as they are able to control the relative movement of tubes 5 and 10.

Referring now to FIG. 4, first hollow tube 5 has a slot 25 formed in the angled end 20 which slot 25 extends through the lower edge 21. Slot 25 allows feed in the feeder 1 to be discharged from the feeder 1.

In use, feeding tube 1 is substantially vertically disposed inside the defined feeding area for the sow to be fed. In one embodiment of the invention, the feeding tube 1 is attached to the individual housing system, an example of which is a crate, of the gestating swine. First hollow tube 5 is connected to volumetric feed dispensers in the housing system so that feed enters the flared end 4. Member 15 rests on the floor of the housing system either directly in front of or behind the feeding area. When feed is delivered by the volumetric dispenser to first hollow tube 5, second hollow tube 10 abutting member 15 restricts gravitational flow of the feed to the feeding area. As the sow raises second hollow tube 10 by applying force to ring 30 with its snout, feed is delivered to the feeding area as the feed flows from first hollow tube 5 in limited amounts through slot 25. As the second hollow tube 10 is raised, rod 35 moves upward engaging casing 38. Casing 38 prevents second hollow tube 10 from ascending further on first hollow tube 5. When the sow ceases the application of force on ring 35, second hollow tube 10 descends stopping the flow of feed from first hollow tube 5 through slot 25.

If desired, feed for the gestating swine can be placed directly in flared end 1 by the farmer. In an alternate embodiment of the present invention, a feed receptacle such as a hopper or bin can be attached to the flared end 4 to supply feed to feeding tube 1.

Having thus described the invention in connection with the preferred embodiments thereof, it will be evident to those skilled in the art that various revisions can be made to the preferred embodiment without departing from the spirit and scope of the invention. It is our intention however that all such revisions and modifications that are evident to those skilled in the art will be included within the scope of the following claims.

What is claimed is:

1. An apparatus for the delivery of feed to animals comprising:
   a first hollow tube having a flared end for receiving the feed and an angled end having a slot for discharging feed;
   a second hollow tube moveable with respect to said first hollow tube and overlapping the angled end of said first hollow tube, wherein a rod is attached to said second hollow tube;
   a guide member combined with the angled end of the first hollow tube so that said feed is normally retained within said first hollow tube;
   a member attached to said second hollow tube upon which member an animal can apply force to move said second hollow tube in order to allow feed to flow from the angled end of said first hollow tube onto the guide member where the animal can eat the feed; and
   a casing combined with the rod and said first hollow tube to restrict the movement of said second hollow tube relative to said first hollow tube.

2. The apparatus of claim 1 wherein said guide member is attached to said first hollow tube.

3. The apparatus of claim 1 wherein said first hollow tube is adapted to be attached to a crate for housing the animal to be fed.

4. The apparatus of claim 1 wherein said flared end is adapted to be connected to volumetric feed dispensers.

5. The apparatus of claim 4 wherein said first hollow tube is adapted to be connected to a crate for housing the animal to be fed.

\* \* \* \* \*